United States Patent [19]

Steinmetz

[11] 4,099,798
[45] Jul. 11, 1978

[54] STRIPPER DEVICE FOR GUIDE TRACKS ON TOOL MACHINES

[75] Inventor: Dietmar Steinmetz, Siegen, Fed. Rep. of Germany

[73] Assignee: Kabelschlepp Gesellschaft mit beschränkter Haftung, Siegen, Fed. Rep. of Germany

[21] Appl. No.: 735,976

[22] Filed: Oct. 27, 1976

[30] Foreign Application Priority Data

Nov. 12, 1975 [DE] Fed. Rep. of Germany ....... 2550790

[51] Int. Cl.² ............................................. F16C 21/00
[52] U.S. Cl. ..................................... 308/3.5; 90/11 R; 277/207 A; 285/302
[58] Field of Search ....................... 285/302; 90/11 R; 277/DIG. 2; 308/3.5

[56] References Cited

U.S. PATENT DOCUMENTS

| | | | |
|---|---|---|---|
| 1,938,786 | 12/1933 | Vancil | 308/3.5 |
| 2,788,716 | 4/1957 | McFerren | 90/11 R |
| 2,968,375 | 1/1961 | Avery, Sr. | 308/3.5 X |
| 3,083,041 | 3/1963 | Owenmark | 285/302 X |
| 3,190,702 | 6/1965 | Flick | 308/3.5 |
| 3,515,444 | 6/1970 | Grabner | 308/3.5 |
| 3,899,183 | 8/1975 | Wild et al. | 277/DIG. 2 |
| 3,964,801 | 6/1976 | Steinmetz | 308/3.5 |

*Primary Examiner*—Othell M. Simpson
*Assistant Examiner*—W. D. Bray
*Attorney, Agent, or Firm*—Martin A. Farber

[57] ABSTRACT

A stripper device for guide tracks on work tool machines for fastening to a part which moves back and forth on the guide track, comprising a stripper ledge made of elastic wear resistant material, which being prestressed abuts the guide track with a stripper lip, and a metal fastening ledge under which an anchoring stay of the stripper ledge is clamped-in. An upper end of the fastening ledge engages the movable part of the tool machine and its lower end forms a groove on a front side thereof and on its rear side an open channel having an undercut opening at an upper end of the latter. The stripper ledge includes a projection which projects into the groove and the anchoring stay is formed with an anchoring head at its upper end which catches in the undercut opening.

8 Claims, 6 Drawing Figures

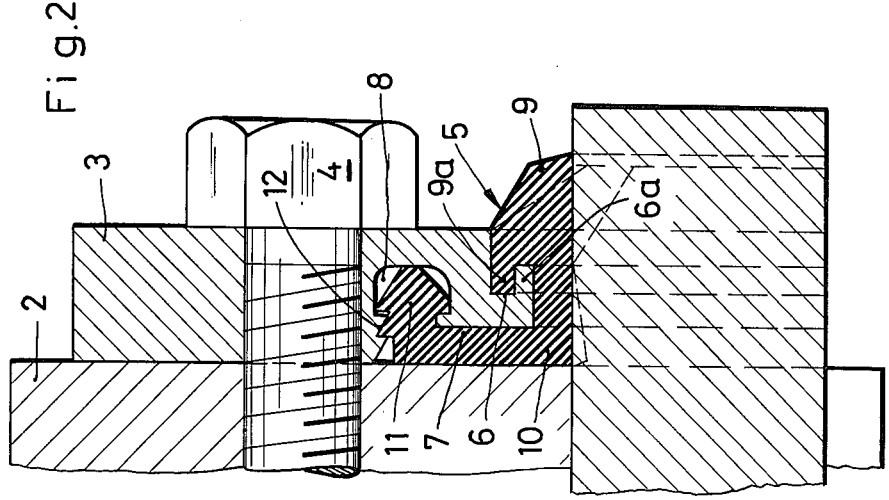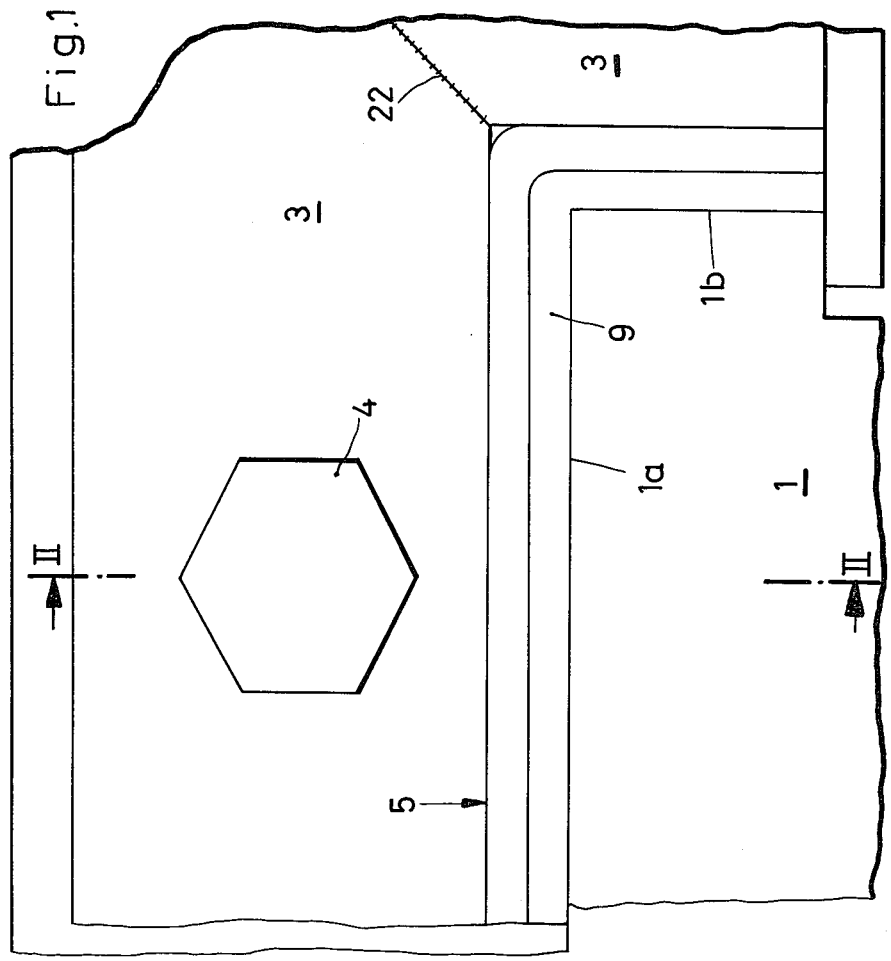

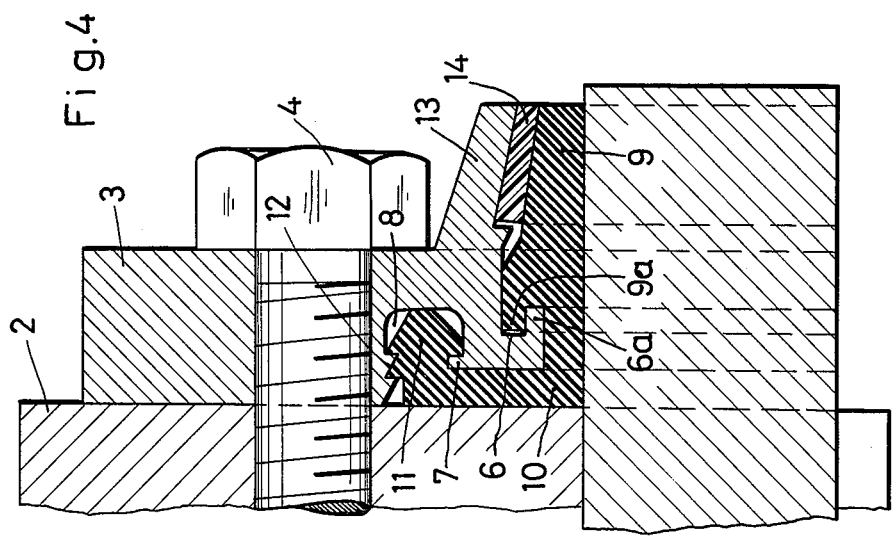
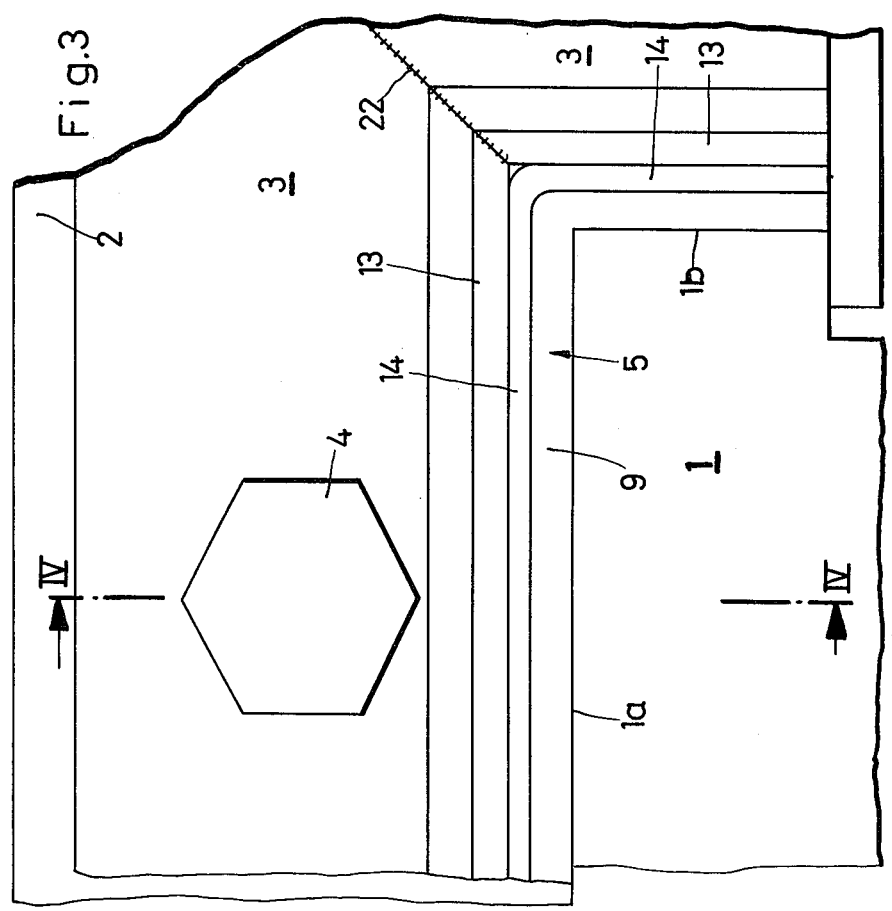

STRIPPER DEVICE FOR GUIDE TRACKS ON TOOL MACHINES

This invention relates to a stripper device for guide tracks on work tool machines for fastening to a part, for example a carriage or slide, which moves back and forth on the guide track, comprising a stripper ledge made of an elastic wear resistant material, which with pre-stressing abuts the guide track with a stripper lip, and a metal fastening ledge under which there is clamped an anchoring stay of the stripper ledge.

Stripper devices for chips, cuttings and dust, for fastening on a moving part of a tool machine, which part travels back and forth on a guide track, are known (German Pat. No. 1,294,111) comprising, an elastic plastic ledge forming a stripper lip extending in its longitudinal direction transversely to the direction of movement of the back and forth traveling part and lying in its width direction inclined to the plane which extends through the guide tracks. With the known stripper devices, the strip-off lip can be rigidly vulcanized onto the sheet metal strip or also adhesively connected thereto. The securing on the back and forth moving part of the tool machine, as a rule, is achieved by screws which are inserted in bores which penetrate through the sheet metal strip and the stripper lip. The screw down surface is consequently usually non-rigid or soft. The stripper device constitutes a typically working wear and tear part which must be replaced at regular intervals. With the known stripper devices, as a rule the sheet metal strip must be replaced, including the stripper lip therewith. A further disadvantage of the known devices is that the fastening of the stripper lip on the sheet metal strip on the back and forth moving part of the tool machine is insufficient, so that during operation, disturbances by partially broken away or torn away stripper lips occur, which must be remedied by replacement of the entire stripper device.

It is an object of the present invention to provide a stripper or scrapper device which in addition to an optimum stripping and sealing effect, has a longest possible service life, and by which the stripper ledge is detachably fastened on the securing ledge and can be quickly exchanged or replaced, whereby the fastening ledge can always be used again. Further an object of the invention also is to avoid the disadvantages of the prior state of the art.

Starting out from the known stripper device with a fastening ledge made of metal and a stripper ledge made of an elastic material, a fundamental object of the present invention is aided in its solution by the following combination features either alone or with other features. In this respect the fastening ledge on the upper end engages the part of the tool machine which moves back and forth and has on its lower end on the front side a groove and on its rear side an open channel with an undercut opening at the upper end. The stripper ledge on its back or base support portion has a projection which projects into the groove and on the upper end of its anchoring stay it has an anchoring head which engagingly catches in the undercut. In accordance with an advantageous formation, the lower leg of the groove in the fastening ledge is formed shortened, so that the stripper sealing lip of the stripper ledge can be pre-stressed and can be supported with its back or base face on the lower side of the fastening ledge, when it is mounted pre-stressed on the part of the machine tool which moves back and forth.

So that the stripper ledge can be pre-assembled on the fastening ledge and can be clamped in reliably with the latter on the part of the tool machine which moves back and forth, a toothing is provided in the undercut of the fastening ledge as well as in the anchoring head of the stripper ledge. For supporting the anchoring, the anchoring stay can have a compression bead 21 on the upper end on the side opposite to the anchoring stay, which bead is pressed against the part of the tool machine which moves back and forth during the securing or fastening of the stripper device.

The fastening ledge can have a protection ledge on its front side which is mounted above the groove and which is downwardly inclined, in order to protect the stripper lip against damage by hot metal chips or cuttings.

For increasing the elasticity, and in connection with this also the service life of a stripper ledge, it is possible to arrange an insert made of a highly elastic material between the stripper lip and the protection ledge. In this manner also a gap formation is prevented, which cannot let dirt particles collect and enter. One embodiment of a stripper device according to the invention has the advantage that the fastening ledge snuggly abuts the back and forth moving part of the tool machine such that a firm screw-on surface is provided for the securing screws. The fastening device formed of the combination of a groove on the front side and an undercut in the rear side of the fastening ledge in connection with the projection and the anchoring head on the stripper ledge offers various advantages. First, it is possible to pre-assemble the stripper ledge on the fastening ledge and to hold the complete stripper device in stock, without both parts unintentionally being able to detach from one another. A further advantage is that the stripper ledge can be absolutely reliably fastened with the fastening ledge on the back and forth moving part of the tool machine, and forms two sealing edges toward the guide track which are disposed on the front and rear edge of the sealing lip which extend crosswise to the guide track. Finally, the exchange of a worn out stripper ledge is simplified by the construction of the anchoring onto the fastening ledge in accordance with the invention and very quickly so that shorter shut down times for the tool machine can be realized if replacement of the stripper or device is necessary. With this the fastening ledge can always be used again.

With the above and other objects and advantages in view, the invention will become more clearly understood from the following detailed description and the accompanying illustrative drawings of preferred embodiments, of which:

FIG. 1 is a broken-away front view of a stripper device of the invention without a protection ledge;

FIG. 2 is a section taken along the lines II—II of FIG. 1;

FIG. 3 is a broken-away front view of a stripper device with a protection ledge;

FIG. 4 is a section taken along the lines IV—IV of FIG. 3;

Figure 5:
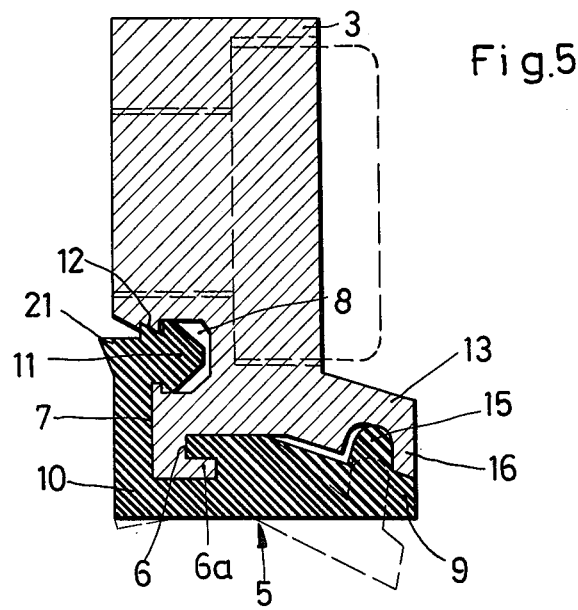
FIG. 5 is a cross-sectional view of a modified embodiment of the stripper device with compression ribs formed on and attached to the upper side of the stripper lip.

Referring to the drawings, and more particularly to FIGS. 1 and 2, a support or carriage 2 which moves back and forth, is arranged on a guide track. A stripper device is necessary so that no dirt and no cuttings which could destroy the guide track are able to penetrate in the gap formed on the upper side 1a and the side walls 1b of the guide track.

The stripper device in accordance with the invention comprises a fastening or securing ledge 3, which can be secured to the carriage 2 with screws 4, and a stripper ledge 5 which is detachably connected with the fastening ledge 3 and is firmly or rigidly clamped with the latter onto the carriage 2.

The fastening ledge 3 has a groove 6 on its lower end on the front side, the lower leg 6a of which fastening ledge 3 is somewhat shorter than the thickness thereof. The leg 6a ends spaced at a distance over the guide track 1. On the rear side, the fastening ledge 3 forms an open channel 7, on an upper end of which an undercut 8 opens.

The stripper ledge 5 comprises a stripper sealing lip 9, an anchoring or fastening stay 10 and a fastening head 11 integrally joined together. A projection 9a is formed on the back of the sealing lip 9, which projection complementarily engages in the groove 6 of the fastening ledge 3. Both in the undercut 8 and on the anchoring head 11 there is formed a cooperative meshing toothing 12 comprising teeth on both parts which also guarantees in the preassembled condition the existence of a secure connection between the fastening ledge 3 and the slipoff ledge 5.

The stripper ledge 5 in the unstressed, non-assembled condition has the shape illustrated in dashed lines in FIG. 2, in order to guarantee in the pre-stressed assembled condition a well set snug engagement of the sealing lip 9 on the guide track and a secure holding of the fastening stay 10 as well as of the fastening anchoring head 11. Also the anchoring head is formed with an arrowhead shape, with the undercut 8 cooperatively narrowed adjacent the base or widest portion of the arrow head. In the assembled condition the arrowhead 11 points in a direction opposite to and parallel to the projection 9a, with the connecting anchoring stay 10 extending perpendicularly thereto in FIGS. 1 - 5.

Referring now to the embodiments illustrated in FIGS. 3, 4 and 5, on the fastening ledge 3, there is integrally formed a protection ledge 13 which extends downwardly inclined and is disposed above the groove 6. Between the protection ledge 13 and the sealing lip 9, there is arranged a highly elastic layer or insert 14, which improves the resiliency characteristics of the sealing lip 9 and increases its service life.

Instead of the insert 14, also a compression rib 15 (FIG. 5) can be integrally formed on the back or base of the sealing lip 9, which rib 15 engages the lower side of the protection ledge 13 under a nose 16 in a groove formed on the bottom of the protection ledge 13.

Figure 6:
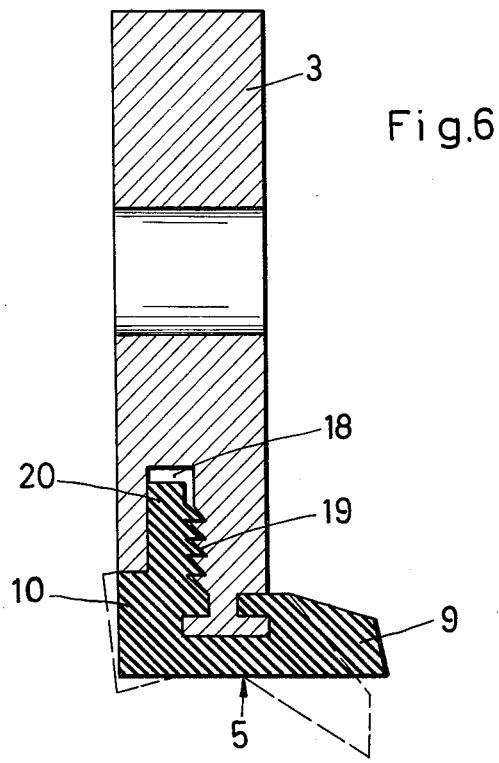
FIG. 6 is a cross-sectional view of another embodiment of a stripper device of the invention with another undercut and an anchoring head adjusted fitting therein.

In FIG. 6 there is illustrated an embodiment of the stripper device in which the undercut 18 has an oblong shape and the cooperative teeth 19 are formed on the front side of the anchoring head 20 and on the forward side of the undercut 18.

The other features of the oblong design of this embodiment of the stripper device of substantially correspond to the stripper formation of FIGS. 1 and 2 and therefore further description is not necessary. On the rear side of the anchoring stay 10, the stripper ledge 5 can be provided on its upper end with a press on bead 21 (FIG. 5), the bulk thereof during assembly being pressed into the undercut 8, and the fastening of the stripper ledge 5 is further improved between the fastening ledge 3 and the carriage 2.

If the guide track 1 is to be stripped on its upper side 1a as well as on its side wall 1b, it is possible without anything more being required, to connect two bevel cut fastening ledges 3 at right angles with each other, as this has been illustrated in FIGS. 1 and 3 with inclined lines 22, and in this manner to fasten an unbent stripper ledge at right angles. In this manner the entire stripper device can be formed of one piece and nevertheless is exactly adjusted to the contour of the guide track 1.

For exchange and replacement of a worn stripper strip 5, the screws 4 must be released. Thereafter it is possible to pull off the stripper ledge 5 from the fastening ledge 3 and to replace it by a new stripper ledge 5.

While there has been disclosed several embodiments of the invention it is to be understood that these embodiments are given by example only and not in a limiting sense.

I claim:

1. A stripper device for guide tracks on a tool machine for fastening to a movable part which moves back and forth on the guide track, comprising
   a stripper ledge of a wear resistant elastic material forming an anchoring stay, the latter having an upper end formed with an anchoring head means thereon, said stripper ledge having a stripper sealing lip compressively resiliently abutting the guide track,
   a fastening ledge having an upper end engaging the movable part of the tool machine and a lower end, the latter forming on a front side thereof a groove, said fastening ledge further having a rear side defining an open channel, the latter having an undercut opening at an upper end of said open channel,
   said stripper ledge including a rearwardly directed projection which projects into said groove, and
   said anchoring head means for engaging in said undercut opening, with said stripper ledge being clamped under said fastening ledge.

2. The stripper device, as set forth in claim 1, wherein said fastening ledge includes a lower leg defining a lower edge of said groove, said lower leg being shortened relative to a remainder of said fastening ledge.

3. The stripper device, as set forth in claim 1, wherein said undercut opening and said anchoring head means are formed with teeth which cooperatively engage in one another.

4. The stripper device, as set forth in claim 1, further comprising
   a compression bead formed on said anchoring stay at said upper end on a side thereof opposite to said anchoring head means.

5. The stripper device, as set forth in claim 1, further comprising
   a frontwise downwardly inclined protection ledge formed on said fastening ledge on the front side thereof positioned above and frontwise relative to said groove.

6. The stripper device, as set forth in claim 5, further comprising an insert positioned between said stripper sealing lip and said protection ledge, and
said insert being made of a highly elastic material.

7. The stripper device, as set forth in claim 5, wherein said stripper sealing lip defines an upper side,
a compression rib means being formed on the upper side of said stripper sealing lip for operatively pressing against said protection ledge.

8. The stripper device, as set forth in claim 7, wherein said protection ledge is formed with a groove in which said compression rib means projects and engages.

* * * * *